(12) United States Patent
Takizawa et al.

(10) Patent No.: US 10,273,738 B2
(45) Date of Patent: Apr. 30, 2019

(54) ACTUATOR AND ACTUATOR FOR OPENING/CLOSING VEHICLE DOOR

(71) Applicant: Mitsuba Corporation, Gunma (JP)

(72) Inventors: Takashi Takizawa, Kiryu (JP); Takahiro Sakiyama, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 15/669,143

(22) Filed: Aug. 4, 2017

(65) Prior Publication Data
US 2018/0044965 A1    Feb. 15, 2018

(30) Foreign Application Priority Data

Aug. 12, 2016   (JP) ................................. 2016-158636

(51) Int. Cl.
  *B60J 7/12*       (2006.01)
  *E05F 15/622*     (2015.01)
  *F16H 21/16*      (2006.01)
  *F16H 21/44*      (2006.01)
  *F16H 25/20*      (2006.01)
  *F16H 35/18*      (2006.01)

(52) U.S. Cl.
  CPC ........... *E05F 15/622* (2015.01); *F16H 21/16* (2013.01); *F16H 21/44* (2013.01); *F16H 25/20* (2013.01); *F16H 35/18* (2013.01); *E05Y 2900/546* (2013.01)

(58) Field of Classification Search
  CPC ..... E05F 15/646; E05F 15/632; E05F 15/689; E05F 15/70; E05F 15/40; E05F 15/643; E05F 15/00; E05F 15/603; F16H 55/303

USPC .... 296/155, 146.9, 203.03, 146.5, 149, 153, 296/202, 24.3, 97.22; 292/57, 59; 310/26.1, 43, 90; 49/360, 209, 217, 26, 49/280, 324, 352
See application file for complete search history.

(56) References Cited

U.S. PATENT DOCUMENTS

| | | | | |
|---|---|---|---|---|
| 9,174,517 | B2 * | 11/2015 | Scheuring | ................ B60J 5/047 |
| 9,353,566 | B2 * | 5/2016 | Miu | ........................ E05F 15/611 |
| 2013/0186220 | A1 * | 7/2013 | Kummer | ............. F16H 25/2003 74/89.42 |
| 2014/0137477 | A1 * | 5/2014 | Ooe | ....................... E05F 1/1091 49/358 |
| 2014/0224045 | A1 * | 8/2014 | Kummer | .................. F16H 19/02 74/60 |

FOREIGN PATENT DOCUMENTS

JP          2014100956 A      6/2014

* cited by examiner

*Primary Examiner* — D Glenn Dayoan
*Assistant Examiner* — Sunsurraye Westbrook
(74) *Attorney, Agent, or Firm* — Wood Herron & Evans LLP (57) ABSTRACT

An actuator includes an actuator main body, an operating shaft attached to a tail gate, a vehicle body-side socket that fixes the actuator main body to an attachment surface of a bracket, and a guide part installed between the attachment surface of the bracket and the vehicle body-side socket, wherein the vehicle body-side socket is fixed to the bracket via the guide part, and the guide part restricts rotation of the vehicle body-side socket about an arbitrary straight line crossing a line in a direction normal to the attachment surface.

11 Claims, 5 Drawing Sheets

ACTUATOR AND ACTUATOR FOR OPENING/CLOSING VEHICLE DOOR

CROSS-REFERENCE TO RELATED APPLICATION

Priority is claimed on Japanese Patent Application No. 2016-158636, filed Aug. 12, 2016, the content of which is incorporated herein by reference.

BACKGROUND

Field of the Invention

The present invention relates to an actuator and an actuator for opening/closing a vehicle door.

Description of Related Art

In the related art, as an actuator for opening/closing a vehicle door, an actuator having a configuration in which an actuator (a support member) configured to open/close a tail gate is installed between the surroundings of an opening section on the side of the vehicle body and the tail gate (a back door) installed in the opening section to be opened and closed is known (for example, see Japanese Unexamined Patent Application, First Publication No. 2014-100956). The actuator includes a first housing having a tubular shape, a second housing formed to have a diameter larger than that of the first housing and into which the first housing is inserted from one end side, a motor unit (a motor) installed in the first housing, a screw spindle connected to the motor unit via a speed reducer and disposed coaxially with the motor unit, a spindle nut fixed to the second housing and screwed onto the screw spindle, and a compression coil spring accommodated in the second housing and configured to bias the first housing and the second housing in an extension direction.

In addition, sockets are installed at both ends of the actuator in an axial direction, i.e., one end of the second housing and the other end of the first housing. The socket of the first housing is pivotably connected to a ball stud installed on a vehicle body. Meanwhile, the socket of the second housing is pivotably connected to a ball stud installed on a tail gate. These sockets are frequently disposed on a central axis of the actuator.

In such a configuration, in the actuator, when the motor unit is rotated and driven, rotation of an output shaft of the motor unit is transmitted to the screw spindle via the speed reducer, and the screw spindle is rotated.

The spindle nut screwed onto the screw spindle is moved in the axial direction of the screw spindle by rotation of the screw spindle. Accordingly, the actuator telescopically extends and retracts as the second housing enters or exits the first housing, and an opening/closing operation of the tail gate is performed. Here, since the sockets are pivotably connected to the ball studs, unreasonable stress is not applied between the actuator, and the body and the tail gate, and the opening/closing operation of the tail gate is smoothly performed.

SUMMARY

However, as in the above-mentioned related art, simple connection of the socket to the ball stud may cause a pivotable range of the socket to be excessively widened. For this reason, when the actuator is driven, the actuator may oscillate around a central shaft of the actuator. The oscillation may become noise during driving of the actuator.

In particular, when a center of gravity of the actuator is disposed at a position deviating from a straight line that connects the two sockets (the two ball studs), the oscillation of the actuator is likely to be increased, and the noise during driving of the actuator is likely to be increased.

An aspect of the present invention is to provide an actuator and an actuator for opening/closing a vehicle door that are capable of suppressing oscillation during driving while maintaining a smooth operation, and reducing noise during driving.

(1) An actuator according to an aspect of the present invention includes an actuator main body; an operating shaft installed on the actuator main body and attached to a body to be operated; an attachment part installed on the actuator main body and that fixes the actuator main body to a fixing surface of the body to be fixed; and a guide part installed between the fixing surface and the attachment part, wherein the attachment part is fixed to the fixing surface via the guide part, and the guide part restricts rotation of the attachment part around an arbitrary straight line crossing a direction of a normal line of the fixing surface.

According to the configuration of the actuator of above mentioned (1), rotation of the attachment part around the arbitrary straight line can be restricted by the guide part. That is, pivotal movement of the attachment part in an arbitrary one direction can be restricted while allowing pivotal movement of the attachment part in a desired direction. For this reason, oscillation and noise during driving of the actuator can be suppressed while maintaining a smooth operation of the actuator.

(2) In the aspect of above mentioned (1), the operating shaft and the attachment part may be disposed on the same straight line and a tip of the operating shaft and the attachment part may be respectively disposed at both sides of the actuator main body, and a center of gravity of the actuator main body may be disposed at a position deviating from a straight line on which the operating shaft and the attachment part are disposed.

As described in above mentioned (2), even when a center of gravity of the actuator main body is disposed at a position deviating from a straight line on which the operating shaft and the attachment part are disposed, oscillation and noise during driving of the actuator can be effectively suppressed.

(3) In the aspect of above mentioned (1) or (2), the guide part may have a support section disposed on any one of the fixing surface and the attachment part; and a guide surface disposed on the other one of the fixing surface and the attachment part, wherein the guide surface may be formed in an arc-shaped convex surface about the normal line.

According to the configuration of the actuator of above mentioned (3), rotation of the attachment part around the arbitrary straight line that crosses with a direction of the normal line of the fixing surface can be reliably restricted while simplifying the configuration of the guide part.

(4) In the aspect of above mentioned (3), the support section may be fixed to the attachment part, a flat restriction plate may be installed on the fixing surface, and the guide surface may abut the restriction plate.

According to the configuration of the actuator of above mentioned (4), for example, even when the fixing surface is easily deformed or the fixing surface is not flat and has irregularities, rotation of the attachment part around the arbitrary straight line that crosses with the direction of the normal line of the fixing surface can be reliably restricted by the guide part.

(5) In the aspect of above mentioned (4), the restriction plate may be formed in a disk shape, a fixing section that fixes the restriction plate to the fixing surface may be formed on the restriction plate on the side of the fixing surface, and a tool locking section that engages with a tool may be formed on an outer circumferential surface of the restriction plate.

According to the configuration of the actuator of above mentioned (5), the restriction plate can be easily fixed to the fixing surface. For this reason, attachment work of the actuator can be facilitated.

(6) In the aspect of any one of above mentioned (1) to (5), the guide part may be formed integrally with the attachment part.

According to the configuration of the actuator of above mentioned (6), the number of parts of the actuator can be reduced, manufacturing costs of the actuator can be reduced, and assembly work of the actuator can be simplified.

(7) In the aspect of any one of above mentioned (1) to (6), the operating shaft may be formed to extend or retract in a direction perpendicular to the direction of the normal line.

As described in above mentioned (7), in the actuator in which the operating shaft extends and retracts in the direction perpendicular to the direction of the normal line, oscillation and noise during driving can be effectively suppressed.

(8) An actuator for opening/closing a vehicle door according to an aspect of the present invention includes the actuator according to above mentioned (7), wherein the body to be fixed may be a vehicle body, a tip of the operating shaft may be attached to the vehicle door, and the vehicle door may be opened and closed.

According to the configuration of the actuator for opening/closing the vehicle door of above mentioned (8), it is possible to provide an actuator for opening/closing the vehicle door capable of suppressing oscillation during driving while maintaining a smooth operation, and reducing noise during driving.

According to the aspects of the present invention, rotation of the attachment part around the arbitrary straight line can be restricted by the guide part. That is, pivotal movement of the attachment part in an arbitrary one direction can be restricted while allowing pivotal movement of the attachment part in a desired direction. For this reason, oscillation and noise during driving of the actuator can be suppressed while maintaining a smooth operation of the actuator.

DETAILED DESCRIPTION OF THE INVENTION

Next, an embodiment of the present invention will be described with reference to the accompanying drawings.
(Actuator for Opening/Closing Vehicle Door)

Figure 1:
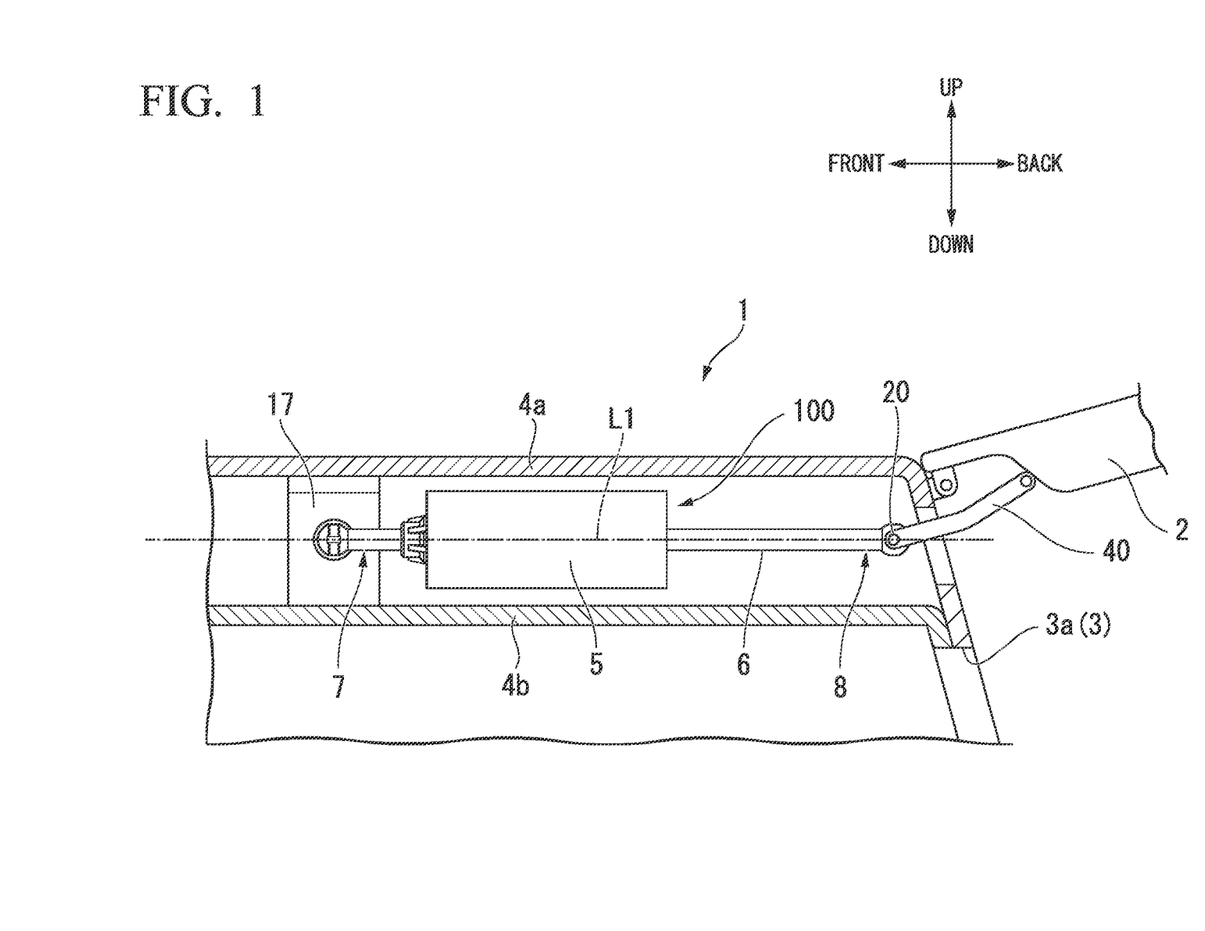
FIG. 1 is a longitudinal cross-sectional view of a vehicle body according to an embodiment of the present invention.

FIG. 1 is a longitudinal cross-sectional view of a vehicle body 1 of an automobile including an actuator 100 for opening/closing a vehicle door (hereinafter, simply referred to as the actuator 100) according to the embodiment of the present invention. Further, in the following description, a forward/rearward direction in the vehicle body 1 in an advancing direction is simply referred to as a forward/rearward direction, a front side in the advancing direction is simply referred to as a front side, a rear side in the advancing direction is simply referred to as a rear side, an upper side in the gravitational direction is simply referred to as an upper side, a lower side in the gravitational direction is simply referred to as a lower side, and a vehicle width direction of the vehicle body 1 is simply referred to as a leftward/rightward direction. In addition, in FIG. 1, a leftward direction is a forward direction, and a rightward direction is a rearward direction.

As shown in FIG. 1, the actuator 100 is configured to open/close a tail gate 2, and installed between an outer roof panel 4a and an inner roof panel 4b that constitute a ceiling of the vehicle body 1. The tail gate 2 is installed on an upper section 3a of an opening section 3 formed in a rear section of the vehicle body 1 and is opened and closed with respect to the opening section 3 via a hinge mechanism 40.

Figure 2:
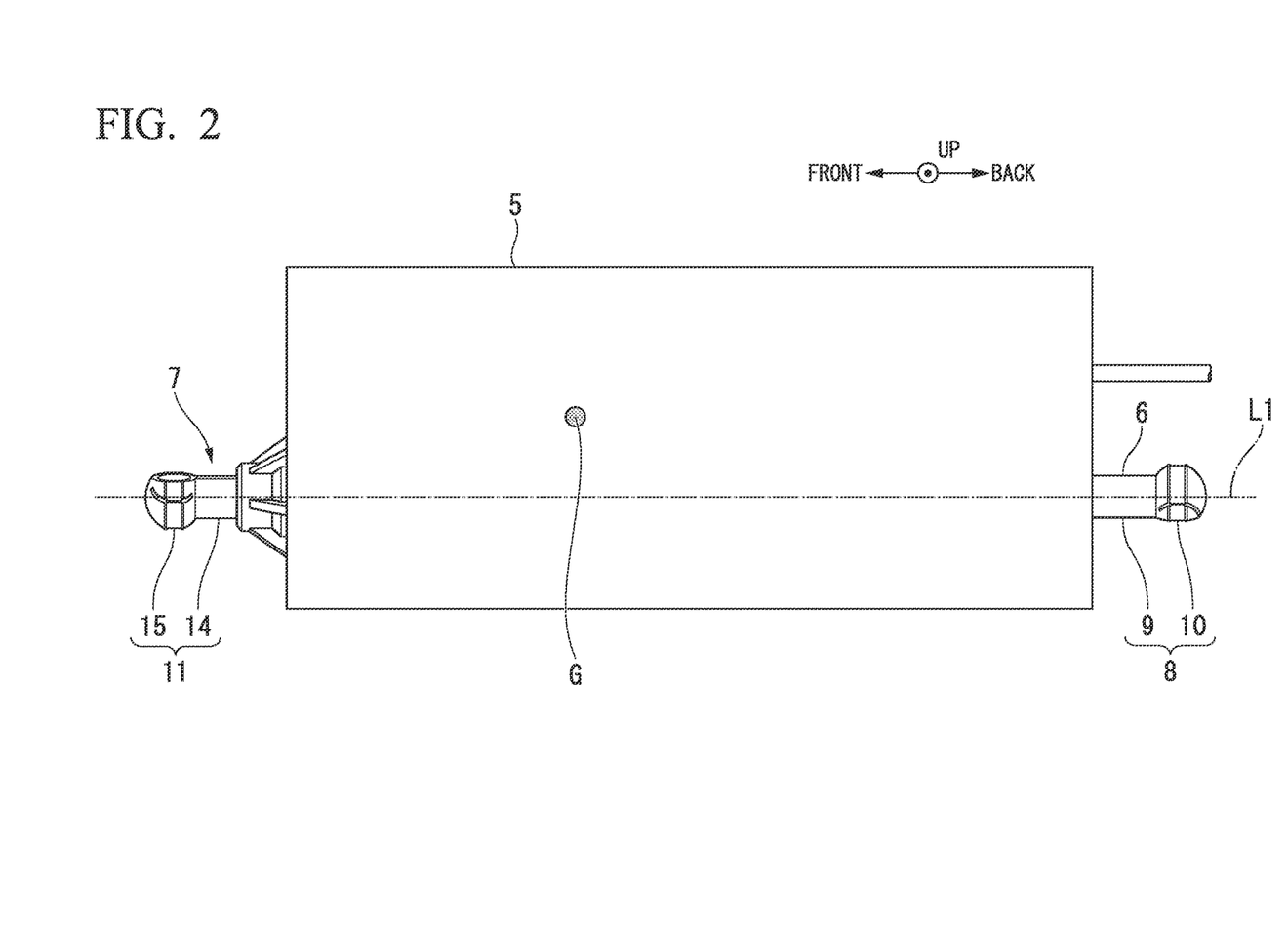
FIG. 2 is a schematic configuration view of an actuator for opening/closing a vehicle door according to the embodiment of the present invention.

FIG. 2 is a schematic configuration view of the actuator 100.

As shown in FIG. 1 and FIG. 2, the actuator 100 includes an actuator main body 5, an operating shaft 6 installed on a rear section of the actuator main body 5 and telescopically movably installed in the forward/rearward direction, and a connecting unit 7 installed on a front section of the actuator main body 5 and configured to fix the actuator main body 5 to the vehicle body 1.

The actuator main body 5 is constituted by a motor, a screw spindle configured to receive a driving force of the motor to be rotated, a spindle nut screwed onto a screw spindle, and so on, which are not shown.

Further, the spindle nut is constituted to move in the axial direction of the screw spindle according to rotation of the screw spindle. The operating shaft 6 is connected to the spindle nut. Accordingly, the operating shaft 6 extends or retracts rearward from the actuator main body 5.

A door-side socket 8 is formed integrally with a tip of the operating shaft 6. The door-side socket 8 is constituted by a shaft section 9 protruding rearward from the operating shaft 6 coaxially with the operating shaft 6, and a socket section 10 formed integrally with a tip of the shaft section 9. A concave fitting section (not shown) is formed in the socket section 10. A ball stud 20 installed on the tail gate 2 is pivotably connected to the concave fitting section.
(Connecting Unit)

Figure 3:
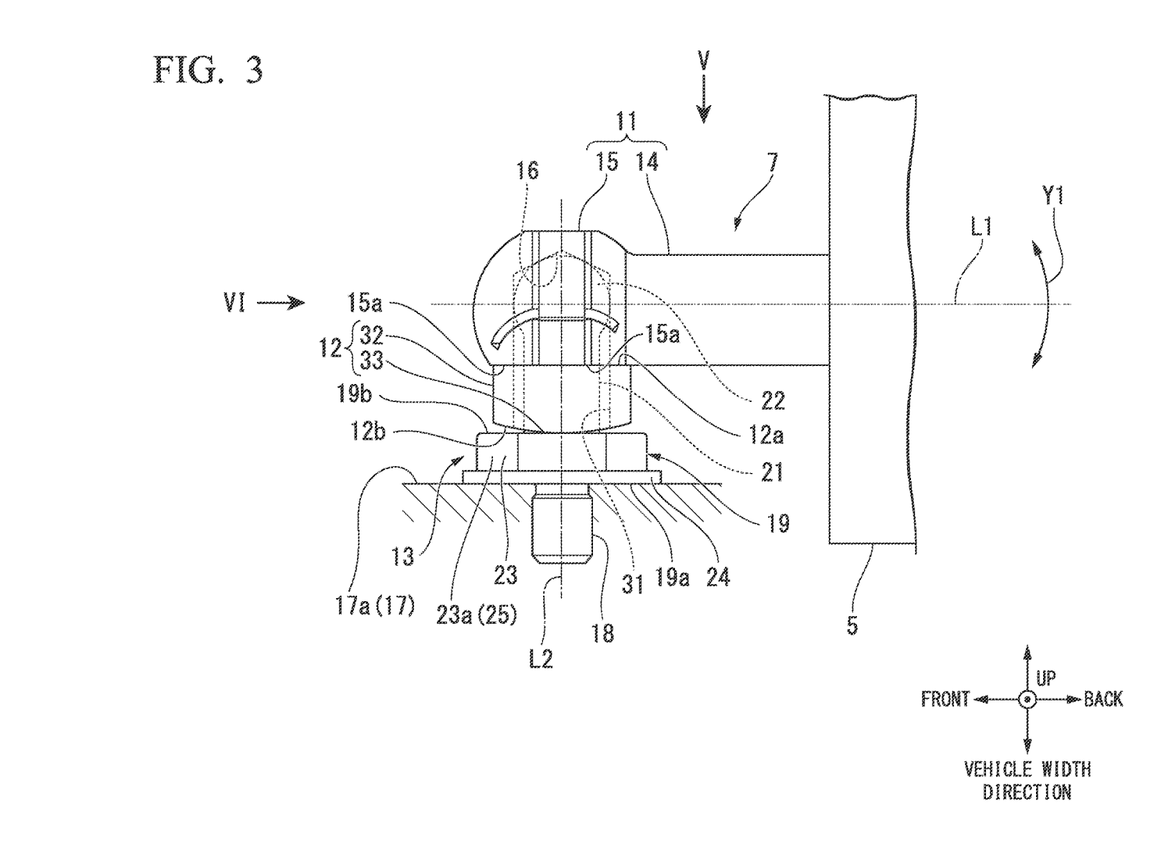
FIG. 3 is a plan view of a connecting unit according to the embodiment of the present invention from above.

FIG. 3 is a plan view of the connecting unit 7 from above.

As shown in FIG. 1 and FIG. 3, the connecting unit 7 is attached to a bracket 17 installed on the outer roof panel 4a. The bracket 17 is formed in a substantially L shape in a cross-sectional view, and a surface perpendicular to the outer roof panel 4a is an attachment surface 17a to which the connecting unit 7 is attached.

The connecting unit 7 includes a vehicle body-side socket 11 protruding forward from a front section of the actuator main body 5, a guide part 12 installed at one side (one side surface 15a to be described below) of the vehicle body-side socket 11, and a ball stud 13 pivotably connected to the vehicle body-side socket 11 where the vehicle body-side socket 11 and the guide part 12 are integrated.

The vehicle body-side socket 11 is constituted by a shaft section 14 protruding forward from the actuator main body 5, and a socket section 15 formed integrally with a tip of the shaft section 14. The socket section 15 is formed in a substantially spherical shape, and has the one side surface 15a formed in a flat shape as if being partially cut away. In addition, the vehicle body-side socket 11 is formed such that the one side surface 15a is substantially parallel to the shaft section 14. Further, the vehicle body-side socket 11 is disposed such that the one side surface 15a is directed toward the attachment surface 17a of the bracket 17.

A concave fitting section 16 into which a spherical head section 22 (to be described below) of the ball stud 13 may be fitted is formed in the one side surface 15a of the vehicle body-side socket 11.

Here, as shown in FIG. 2, the shaft section 14 of the vehicle body-side socket 11, the shaft section 9 of the door-side socket 8, and the operating shaft 6 are disposed on the same axis L1 (a straight line extending in the forward/rearward direction). In addition, a center of gravity G of the actuator main body 5 is disposed at a position deviating from the axis L1.

Returning to FIG. 3, the ball stud 13 is formed of a metal having high rigidity. The ball stud 13 is constituted by a restriction plate 19 having substantially a disk shape and disposed on the attachment surface 17a of the bracket 17, a male screw section 18 protruding from the restriction plate 19 toward the attachment surface 17a of the bracket 17, a shaft section 21 protruding from the restriction plate 19 toward an opposite side of the male screw section 18, and the spherical head section 22 formed integrally with a tip of the shaft section 21.

The restriction plate 19, the male screw section 18, the shaft section 21 and the spherical head section 22 are disposed on the same axis L2. The axis L2 extends in a vehicle width direction because the axis L2 is perpendicular to the attachment surface 17a of the bracket 17. That is, the axis L2 is substantially perpendicular to the axis L1 on which the shaft section 14 of the vehicle body-side socket 11, the shaft section 9 of the door-side socket 8, and the operating shaft 6 are parallel.

The male screw section 18 is formed to be fastened and fixed to the bracket 17.

The restriction plate 19 has a restriction plate main body 23 and a base flange section 24 formed to have a diameter larger than that of the restriction plate main body 23, which are formed integrally. Then, the base flange section 24 abuts the attachment surface 17a of the bracket 17.

In addition, an outer circumferential surface 23a of the restriction plate main body 23 is formed in a polygonal shape (a hexagonal shape in the embodiment). Accordingly, a tool such as a hexagonal spanner or the like can be engaged with the outer circumferential surface 23a. That is, the outer circumferential surface 23a functions as a tool locking section 25 that can be engaged with a tool.

The male screw section 18 of the ball stud 13 is fastened and fixed to the bracket 17 by engaging the tool with the tool locking section 25.

In addition, a surface of the restriction plate main body 23 from which the shaft section 21 protrudes is a restriction surface 19b that is flat. The restriction surface 19b cooperates with the guide part 12 to restrict pivotal movement of the vehicle body-side socket 11 around the axis L1 (to be described below in detail).

The shaft section 21 is formed from the restriction surface 19b of the restriction plate main body 23 to the concave fitting section 16 of the vehicle body-side socket 11 via the guide part 12. Then, the spherical head section 22 is pivotably fitted into the concave fitting section 16 of the vehicle body-side socket 11.

(Guide Section)

Figure 4:
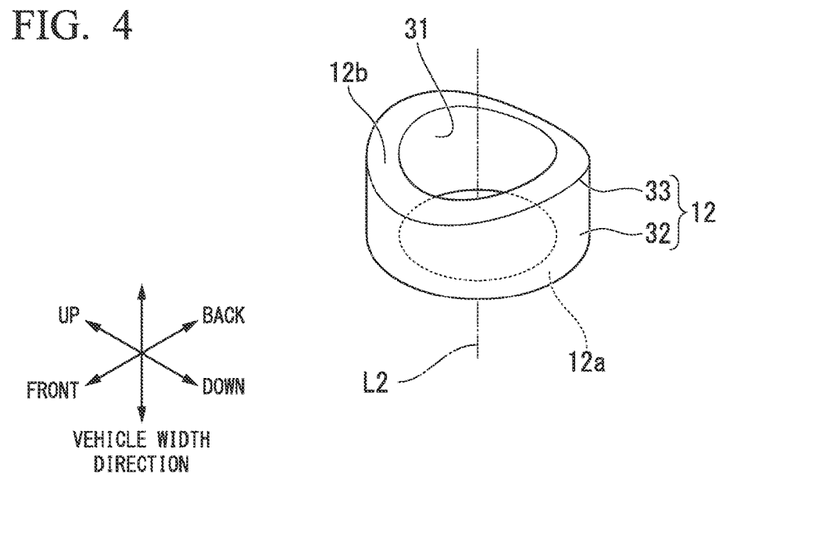
FIG. 4 is a perspective view of a guide unit according to the embodiment of the present invention.

FIG. 4 is a perspective view of the guide part 12.

As shown in FIG. 3 and FIG. 4, the guide part 12 is disposed between the one side surface 15a formed on the socket section 15 of the vehicle body-side socket 11 and the restriction surface 19b of the restriction plate 19. The guide part 12 has a support section 32 having a substantially columnar shape and disposed on the side of the vehicle body-side socket 11, and a guide main body 33 disposed on the side of the restriction plate 19, which are formed integrally with each other. The guide part 12 is disposed such that a central shaft of the support section 32 is coaxial with the shaft section 21 (the axis L2) of the ball stud 13. Then, a through-hole 31 through which the shaft section 21 and the spherical head section 22 can pass is formed in substantially a center of the guide part 12 in a radial direction. Since a shaft diameter of the shaft section 21 is set to be smaller than a diameter of the spherical head section 22, a sufficient gap is secured in a state in which the shaft section 21 is inserted through the through-hole 31.

A bottom surface of the support section 32, i.e., a surface of the guide part 12 on the side of the one side surface 15a of the socket section 15 is set as a socket abutting surface 12a abutting the one side surface 15a. The socket abutting surface 12a is formed in a flat shape. The socket abutting surface 12a abuts to overlap the one side surface 15a of the socket section 15. Further, the support section 32 of the guide part 12 may be fixed to the one side surface 15a of the socket section 15.

Meanwhile, a surface of the guide main body 33, i.e., a surface of the guide part 12 on the side of the restriction surface 19b of the restriction plate 19 is set as a restriction plate abutting surface 12b abutting the restriction surface 19b. The restriction plate abutting surface 12b is formed in an arc shape.

More specifically, the restriction plate abutting surface 12b is formed in an arc shape centered on the axis L2, and is a convex surface with a center thereof in the forward/rearward direction (the axis L1 direction) protruding closest to the restriction plate 19. Meanwhile, an arbitrary portion of the restriction plate abutting surface 12b in an upward/downward direction (a direction normal to a plane (hereinafter, referred to as a plane L1-L2) including the axis L1 (in the forward/rearward direction) and the axis L2 (in the vehicle width direction)) has a flat form in all places. In other words, the restriction plate abutting surface 12b is formed in substantially a Kamaboko shape (a semi-cylindrical external shape). The restriction plate abutting surface 12b abuts the restriction surface 19b of the restriction plate 19.

(Action of Guide Part)

Next, an action of the guide part 12 will be described on the basis of FIG. 3, FIG. 5 and FIG. 6.

Figure 5:
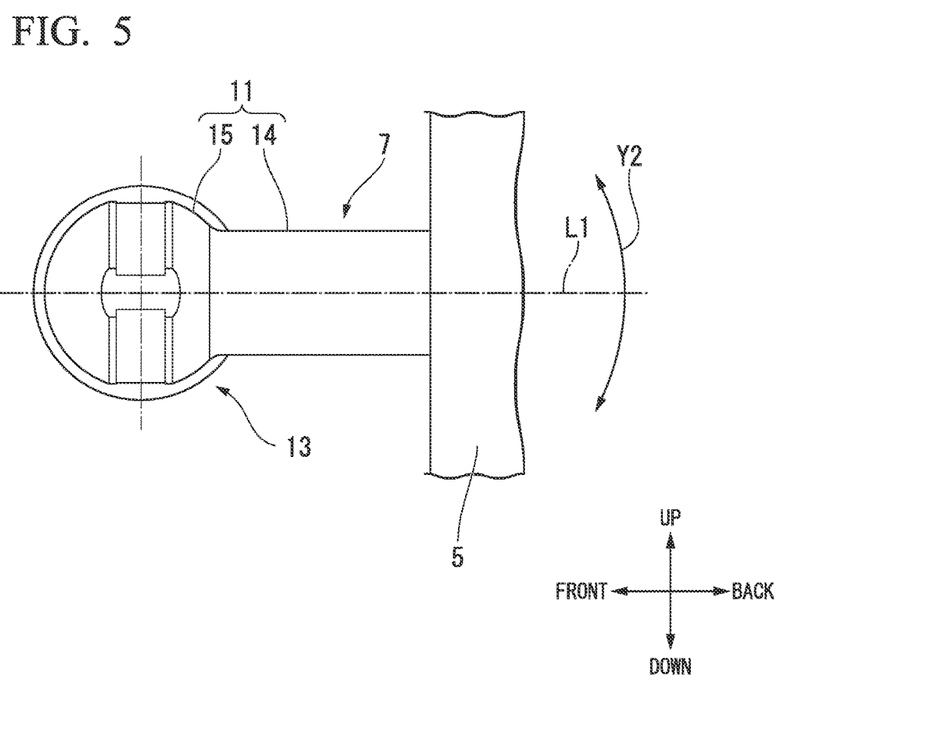
FIG. 5 is a view seen from an arrow V of FIG. 3.

FIG. 5 is a view seen from an arrow V of FIG. 3. FIG. 6 is a view seen from an arrow VI of FIG. 3.

Figure 6:
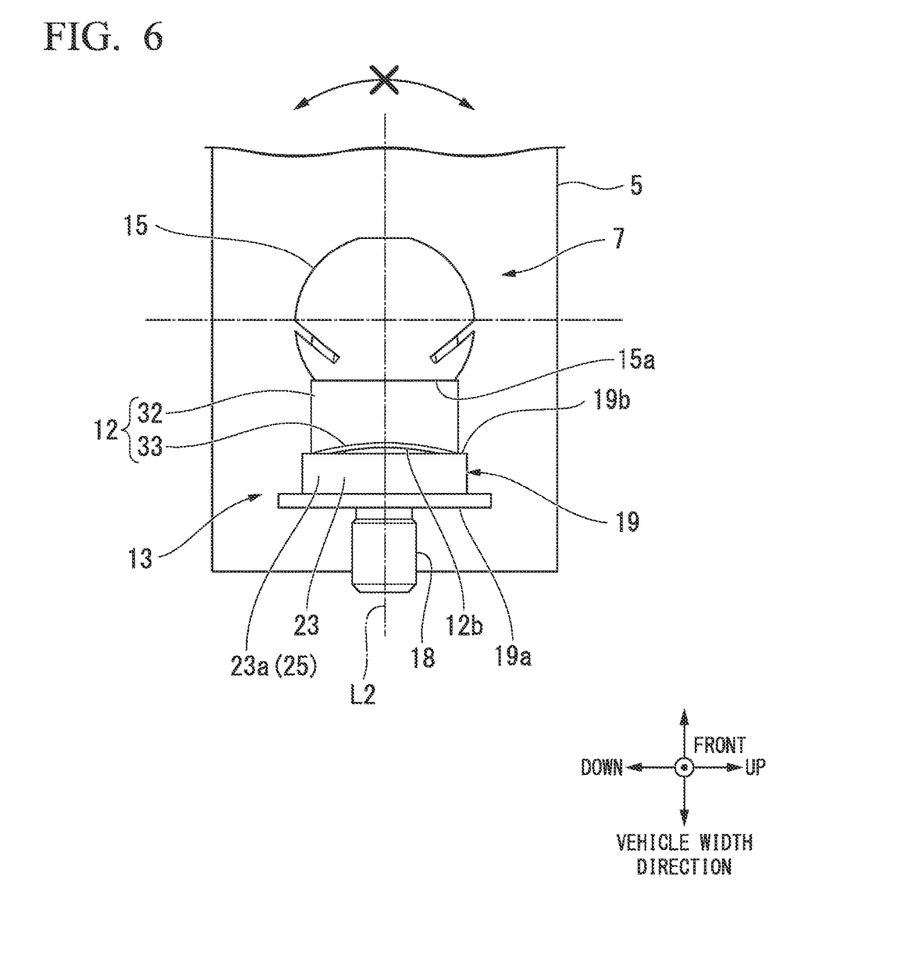
FIG. 6 is a view seen from an arrow VI of FIG. 3.

As shown in FIG. 3, FIG. 5 and FIG. 6, in the connecting unit 7 installed on the actuator main body 5, since the guide part 12 is installed between the restriction plate 19 fastened and fixed to the bracket 17 installed on the outer roof panel 4a and the vehicle body-side socket 11, a movement range of the vehicle body-side socket 11 is restricted.

That is, as described above, the socket section 15 of the vehicle body-side socket 11 fitted onto the spherical head section 22 of the ball stud 13 is pivotable about the spherical head section 22. Here, the one side surface 15a of the socket section 15 and the socket abutting surface 12a of the guide part 12 overlap each other. For this reason, when the socket section 15 is to be pivoted, the guide part 12 is to be pivoted following movement of the vehicle body-side socket 11.

Here, since the restriction plate abutting surface 12b of the guide part 12 is an arc-shaped convex surface in which a center thereof in the forward/rearward direction (the axis L1 direction) protrudes closest to the restriction plate 19, the guide part 12 pivots on the plane L1-L2 such that the restriction plate abutting surface 12b rolls on the restriction surface 19b of the restriction plate 19 (see an arrow Y1 in FIG. 3). That is, the actuator 100 is pivotable about the spherical head section 22 of the ball stud 13 in the vehicle width direction.

In addition, here, since a sufficient gap is secured in a state in which the through-hole 31 is formed in the guide part 12 and the shaft section 21 is inserted through the through-hole 31, pivotal movement of the guide part 12 is not inhibited by the shaft section 21 of the ball stud 13.

Further, the vehicle body-side socket 11 pivots around the axis L2 (the shaft section 21) (an arrow Y2 in FIG. 5). That is, the actuator 100 is pivotable about the spherical head section 22 of the ball stud 13 in the upward/downward direction.

On the other hand, as shown in FIG. 6, pivotal movement of the vehicle body-side socket 11 around the axis L1 is restricted because the socket abutting surface 12a in the direction of the axis L1 is flat (because the socket abutting surface 12a is not formed in an arc shape). In other words, pivotal movement of the vehicle body-side socket 11 around the axis L1 perpendicular to the direction normal to (the axis L2) the attachment surface 17a of the bracket 17 is restricted by the guide part 12.

In such a configuration, as shown in FIG. 1, in a state in which the tail gate 2 is closed, the operating shaft 6 of the actuator 100 retracts. From this state, when the operating shaft 6 extends, the tail gate 2 is pressed rearward, and the tail gate 2 is opened via a hinge mechanism (not shown).

Here, a connecting position between the tail gate 2 and the door-side socket 8 installed on the tip of the operating shaft 6 of the actuator 100 deviates somewhat in the upward/downward direction and the vehicle width direction. That is, an inclination of the axis L1 on which the shaft section 14 of the vehicle body-side socket 11, the shaft section 9 of the door-side socket 8, and the operating shaft 6 are parallel varies.

Here, since the operating shaft 6 and the hinge mechanism 40 of the tail gate 2 are connected to each other via the door-side socket 8 and the ball stud 20, the operating shaft 6 can smoothly follow a variation in inclination of the axis L1. Meanwhile, in the connecting unit 7 disposed in front of the actuator 100, pivotal movement in the vehicle width direction and the upward/downward direction of the vehicle body-side socket 11 about the ball stud 13 fastened and fixed to the bracket 17 is allowed by the guide part 12. For this reason, the tail gate 2 can be smoothly opened and closed.

On the other hand, pivotal movement around the axis L1 is restricted by the guide part 12. For this reason, oscillation and shaking of the actuator 100 in an undesirable direction are suppressed.

Accordingly, according to the above-mentioned embodiment, as the guide part 12 is installed between the one side surface 15a formed on the socket section 15 of the vehicle body-side socket 11 and the restriction surface 19b of the restriction plate 19 fastened and fixed to the bracket 17 installed on the outer roof panel 4a, the opening/closing operation of the tail gate 2 by the actuator 100 can be smoothly performed. In addition, oscillation and noise during driving of the actuator 100 can be suppressed.

In particular, in the actuator 100 in which the shaft section 14 of the vehicle body-side socket 11, the shaft section 9 of the door-side socket 8, and the operating shaft 6 are disposed on the same axis L1 and the center of gravity G of the actuator main body 5 is disposed at a position deviating from the axis L1, the actuator main body 5 (the vehicle body-side socket 11) easily oscillates around the axis L1. However, oscillation and noise during driving of the actuator 100 can be effectively suppressed using the guide part 12.

In addition, the guide part 12 has the restriction plate abutting surface 12b serving as a convex surface formed in an arc shape about the axis L2 and having a center in the forward/rearward direction (the axis L1 direction) protruding closest to the restriction plate 19. Then, as the restriction plate abutting surface 12b abuts the restriction surface 19b of the restriction plate 19, pivotal movement of the vehicle body-side socket 11 (the actuator main body 5) in the plane L1-L2 (in the vehicle width direction) is allowed, and pivotal movement of the vehicle body-side socket 11 in a direction perpendicular to the plane L1-L2 (in the upward/downward direction) is allowed. Meanwhile, pivotal movement of the vehicle body-side socket 11 around the axis L1 is restricted. In this way, pivotal movement of the vehicle body-side socket 11 (the actuator main body 5) in an arbitrary direction can be restricted while simplifying the configuration of the guide part 12.

In addition, the restriction plate 19 having a restriction surface 19a that is flat is installed on the attachment surface 17a of the bracket 17, and the restriction plate abutting surface 12b of the guide part 12 is made to abut the restriction plate 19 (the restriction surface 19a). For this reason, for example, even when the attachment surface 17a is easily deformed or the attachment surface 17a is not flat and has irregularities, pivotal movement of the vehicle body-side socket 11 (the actuator main body 5) around the axis L1 can be reliably restricted by the guide part 12.

Further, the restriction plate 19 that constitutes the ball stud 13 is formed in substantially a disk shape, and the outer circumferential surface 23a of the restriction plate main body 23 of the restriction plate 19 is formed in a polygonal shape. Then, the outer circumferential surface 23a having the polygonal shape functions as the tool locking section 25 that can be engaged with a tool. For this reason, the ball stud 13 can be easily fastened and fixed to the bracket 17 using the restriction plate 19. Accordingly, attachment work of the ball stud 13 (the actuator 100) with respect to the bracket 17 can be facilitated.

Further, the present invention is not limited to the above-mentioned embodiment and various modifications may be added to the above-mentioned embodiment without departing from the scope of the present invention.

For example, in the above-mentioned embodiment, the case in which the actuator 100 is the vehicle door opening/closing actuator configured to open and close the tail gate 2 of the vehicle body 1 has been described. In addition, the case in which the actuator 100 is installed between the outer roof panel 4a and the inner roof panel 4b has been described. However, there is no limitation thereto and the actuator 100 may be used in various apparatuses. In addition, also when the actuator 100 is used as the actuator for opening/closing the vehicle door, the actuator 100 may be installed at various positions on the vehicle body 1.

Further, in the above-mentioned embodiment, the case in which the connecting unit 7 having the guide part 12 is installed on the actuator 100 including the actuator main body 5, the center of gravity G of which is disposed at a position deviating from the axis L1, has been described. However, there is no limitation thereto and the configuration of the connecting unit 7 may also be employed in an actuator in which the center of gravity G of the actuator main body 5 is disposed on the axis L1.

In addition, in the above-mentioned embodiment, the case in which the actuator 100 includes the operating shaft 6 telescopically extending and retracting from/into the actuator main body 5 has been described. However, there is no limitation thereto and the operating shaft 6 may be configured to rotate around the axis L1 with respect to the actuator main body 5. The actuator 100 is not mainly used as an actuator for opening/closing a vehicle door and may be used in various apparatuses.

Further, in the above-mentioned embodiment, the case in which the guide part 12 is installed between the one side surface 15a formed on the socket section 15 of the vehicle body-side socket 11 and the restriction surface 19ab of the restriction plate 19, and the one side surface 15a of the socket section 15 and the socket abutting surface 12a of the guide part 12 overlap each other, and as a result, the vehicle body-side socket 11 and the guide part 12 are pivoted integrally has been described. Alternatively, the case in which the support section 32 of the guide part 12 is fixed to the one side surface 15a of the socket section 15 has been described.

However, there is no limitation thereto and the vehicle body-side socket 11 and the guide part 12 may be integrated. For example, the guide part 12 may be formed of a resin, and the guide part 12 may be formed on the vehicle body-side socket 11 through outsert molding. According to the above-mentioned configuration, the number of parts of the actuator 100 can be reduced, manufacturing costs of the actuator 100 can be reduced, and assembly work of the actuator 100 can be simplified.

In addition, in the above-mentioned embodiment, the case in which, in the actuator 100, the shaft section 14 of the vehicle body-side socket 11, the shaft section 9 of the door-side socket 8 and the operating shaft 6 are installed on the same axis L1, and the restriction plate 19 of the ball stud 13, the male screw section 18, the shaft section 21 and the spherical head section 22 are installed on the axis L2 perpendicular to the axis L1 has been described. Then, the case in which the guide part 12 restricts pivotal movement of the vehicle body-side socket 11 around the axis L1 perpendicular to the direction normal to (the axis L2) the attachment surface 17a of the bracket 17 has been described.

However, there is no limitation thereto and the axis L1 and the axis L2 may be arbitrarily set as long as they cross each other. Then, the guide part 12 may restrict pivotal movement of the vehicle body-side socket 11 around a straight line with respect to an arbitrary straight line crossing the direction normal to (the axis L2) the attachment surface 17a of the bracket 17.

Further, in the above-mentioned embodiment, the case in which the connecting unit 7 is attached to the bracket 17 installed on the outer roof panel 4a has been described. In addition, the case in which the bracket 17 is formed in a substantially L-shaped cross section has been described.

However, there is no limitation thereto and the bracket 17 may have an arbitrary shape. In addition, the connecting unit 7 may be directly attached to the outer roof panel 4a (the vehicle body 1) without using the bracket 17. Even in this case, since the guide part 12 abuts the restriction plate 19 having high rigidity, pivotal movement of the vehicle body-side socket 11 around the axis L1 can be restricted by the guide part 12.

In addition, when the rigidity of a body to be fixed, to which the actuator 100 is fixed, such as the outer roof panel 4a or the like is high, the restriction plate 19 may not be installed on the ball stud 13. Then, the restriction plate abutting surface 12b of the guide part 12 may be configured to directly abut a fixing surface of the body to be fixed. According to the above-mentioned configuration, the configuration of the ball stud 13 can be simplified, and a product cost of the actuator 100 can be further reduced.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An actuator comprising:
an actuator main body;
an operating shaft installed on the actuator main body and attached to a body to be operated;
an attachment part that is installed on the actuator main body and that fixes the actuator main body to a fixing surface of the body to be fixed via a fixing member which includes a shaft section protruding from the fixing surface and a spherical head section formed integrally with a tip of the shaft section; and
a guide part installed between the fixing surface and the attachment part so as to be disposed on a same axis with the shaft section,
wherein the attachment part is fixed to the fixing surface via the guide part, and
the guide part restricts rotation of the attachment part around an arbitrary straight line crossing a direction of a normal line of the fixing surface.

2. The actuator according to claim 1,
wherein the operating shaft and the attachment part are disposed on the same straight line and a tip of the operating shaft and the attachment part are respectively disposed at both sides of the actuator main body, and
a center of gravity of the actuator main body is disposed at a position deviating from a straight line on which the operating shaft and the attachment part are disposed.

3. The actuator according to claim 1, wherein the guide part has:
a support section disposed on any one of the fixing surface and the attachment part; and
a guide surface disposed on the other one of the fixing surface and the attachment part,
wherein the guide surface is formed in an arc-shaped convex surface about the normal line.

4. The actuator according to claim 2,
wherein the guide part has:
a support section disposed on any one of the fixing surface and the attachment part; and
a guide surface disposed on the other one of the fixing surface and the attachment part,
wherein the guide surface is formed in an arc-shaped convex surface about the normal line.

5. The actuator according to claim 3,
wherein the support section is fixed to the attachment part, a flat restriction plate is installed on the fixing surface, and the guide surface abuts the restriction plate.

6. The actuator according to claim 4,
wherein the support section is fixed to the attachment part, a flat restriction plate is installed on the fixing surface, and the guide surface abuts the restriction plate.

7. The actuator according to claim 5,
wherein the restriction plate is formed in a disk shape,
a fixing section that fixes the restriction plate to the fixing surface is formed on the restriction plate on the side of the fixing surface, and
a tool locking section that engages with a tool is formed on an outer circumferential surface of the restriction plate.

8. The actuator according to claim 6,
wherein the restriction plate is formed in a disk shape,
a fixing section that fixes the restriction plate to the fixing surface is formed on the restriction plate on the side of the fixing surface, and
a tool locking section that engages with a tool is formed on an outer circumferential surface of the restriction plate.

9. The actuator according to claim 1,
wherein the guide part is formed integrally with the attachment part.

10. The actuator according to claim 1,
wherein the operating shaft is formed to extend or retract in a direction perpendicular to the direction of the normal line.

11. An actuator for opening/closing a vehicle door, comprising the actuator according to claim 10,
wherein the body to be fixed is a vehicle body,
a tip of the operating shaft is attached to the vehicle door, and
the vehicle door is opened and closed.

* * * * *